E. T. UNDERWOOD.
CULTIVATOR ATTACHMENT.
APPLICATION FILED SEPT. 24, 1910.
1,009,356.
Patented Nov. 21, 1911.
2 SHEETS—SHEET 1.
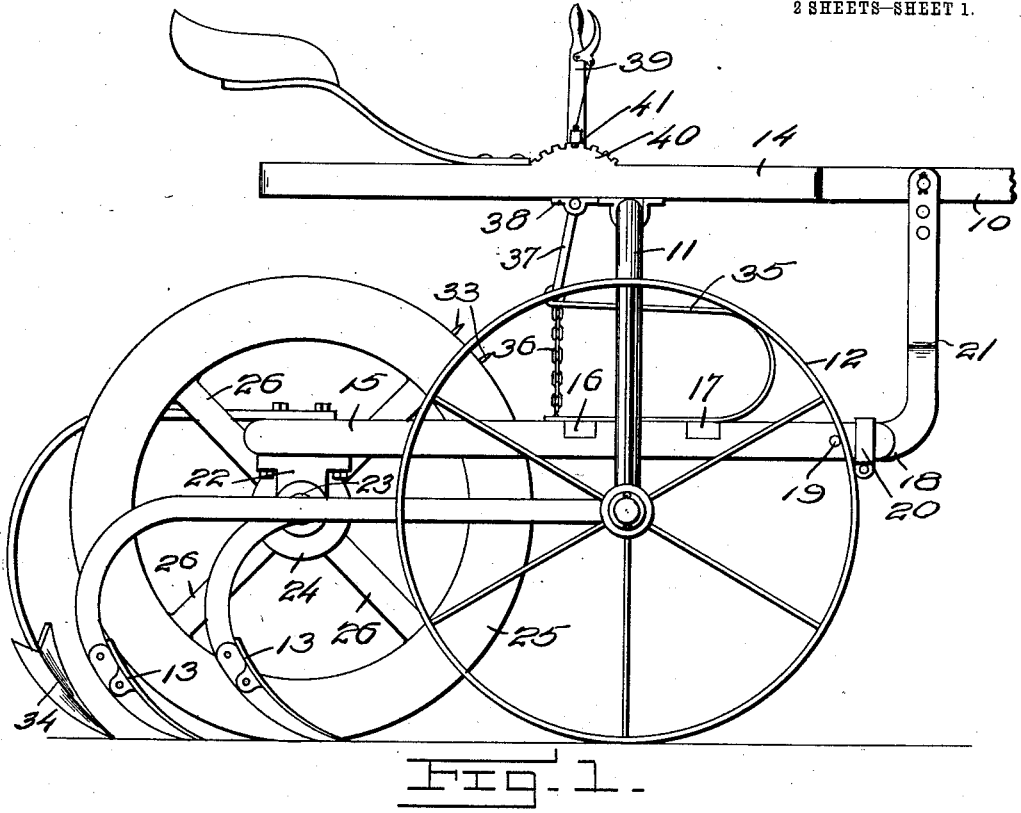
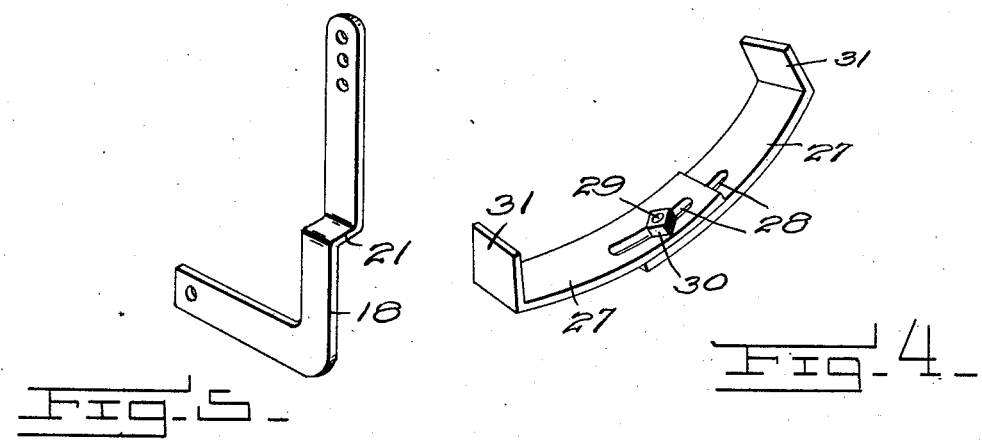
Witnesses
Inventor
E. T. Underwood,
By Woodward & Chandlee.
Attorneys E. T. UNDERWOOD.
CULTIVATOR ATTACHMENT.
APPLICATION FILED SEPT. 24, 1910.
1,009,356.
Patented Nov. 21, 1911.
2 SHEETS—SHEET 2.
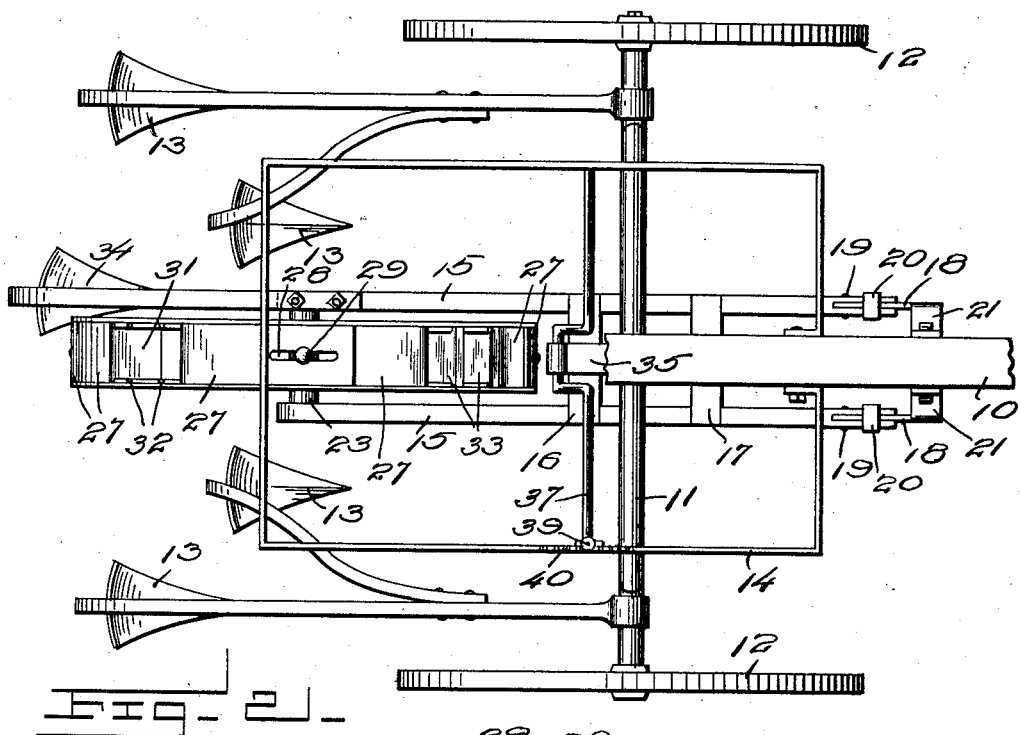
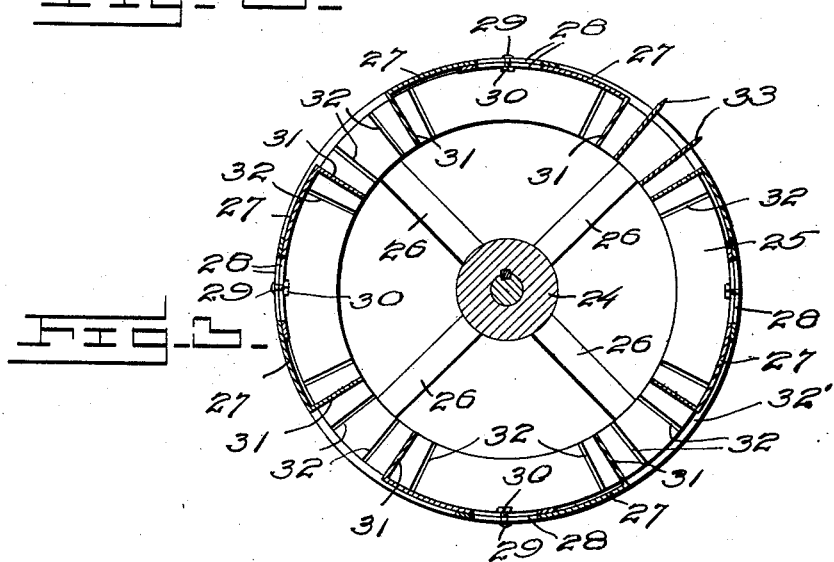
Witnesses
Inventor
E. T. Underwood,
By Woodward & Chandlee
Attorneys

UNITED STATES PATENT OFFICE.

ELVY T. UNDERWOOD, OF LLANO, TEXAS.

CULTIVATOR ATTACHMENT.

1,009,356.  Specification of Letters Patent.  Patented Nov. 21, 1911.

Application filed September 24, 1910. Serial No. 583,679.

*To all whom it may concern:*

Be it known that I, ELVY T. UNDERWOOD, a citizen of the United States, residing at Llano, in the county of Llano and State of Texas, have invented certain new and useful Improvements in Cultivator Attachments, of which the following is a specification.

This invention relates to attachments for cultivators and the object of the invention is to provide a combined cotton chopper and rolling fender of simple construction which may be readily attached to or removed from a cultivator of the usual straddle row wheel type.

A further object is the provision of a novelly constructed chopper wheel which may be adapted for use in crushing the plants desired and also to protect such plants as are to constitute the stand in thinning out the rows of cotton during their cultivation.

A still further object is to so construct the wheel that the hills of cotton are shortened as desired and that the cotton may be cut between the hills so as to insure killing of vegetation therebetween, even in cases where the ground is extraordinarily hard.

Other objects and advantages will be apparent from the following description, and it will be understood that changes in the specific structure shown and described may be made within the scope of the claims without departing from the spirit of the invention.

In the drawings: Figure 1 is a side elevation of a cultivator with my improved attachment attached thereto. Fig. 2 is a plan view of the device. Fig. 3 is a detail sectional view of the chopper wheel. Fig. 4 is a detail perspective view of one of the adjustable segments of the rim of the chopper wheel. Fig. 5 is a similar view of one of the securing arms by which the frame is attached to the tongue of the cultivator.

Referring to the drawings in detail, 10 designates the tongue of a suitable straddle row wheel cultivator having the usual straddle frame 11 having suitable supporting wheels 12 and cultivator plows 13. The rear end of the tongue 10 extends beyond the frame as shown in Fig. 1 of the drawings, and my improved attachment is secured thereto in a manner to be subsequently described, the frame of the plow also comprises the rectangular structure 14 to which the means for raising and lowering the chopper wheel frame, is secured.

My attachment specifically consists of a frame structure having the side beams 15 properly secured together intermediate their ends by means of the cross braces 16 and 17, the forward ends of the beams being split and having the arms 18 fitted therein and secured in a suitable manner by means of cross pins 19 and suitable ferrules 20 disposed therearound. As is more clearly shown in Fig. 5 of the drawings, the arms 18 are bent inwardly as shown at 21 and the upper ends thereof are provided with suitable openings in registry and adapted to receive suitable pivot pins extending from opposite sides of the tongue, whereby said parts are pivotally connected.

The rear ends of the beams are provided with bearing boxes 22 upon their under sides in which an axle 23 is journaled and upon which the chopper wheel is mounted and adapted for rotation. This wheel comprises a hub 24 which is keyed to the axle 23 and the metallic rims 25 are secured thereto in proper spaced relation by means of spokes 26, which are preferably four in number. In order to provide for properly crushing certain of the plants, I construct the rim of the wheel in segments, each comprising a pair of plates 27 of the proper curvature and provided with slotted openings 28 adapted to register with each other when the plates are in overlapped relation and properly secured by means of a bolt 29 and a nut 30. The plates 27 are provided with inturned ends 31 which are received within suitable slotted grooves 32 in the inner faces of the rims 25 and arranged concentrically relative to the axis of the wheel a plurality of grooves are provided, whereby said plates may be adjusted to the proper position and fitted between the rims.

By the above construction the number of pockets or spaces between each pair of plates may be regulated, as well as the size thereof, according to the size of the stand desired to be made. In cases where the ground is unusually hard, I may employ a pair of knife blades 33 which extend outwardly from the rims and are properly spaced between the ends of the segments or plates disposed therebetween, so that the plants will be cut to insure killing of the vegetation when the wheel is rolled thereover. Also by removing the segmental plates which are adapted to crush the plants, a rolling fender is provided which will not catch in weeds and also prevents the plows from covering the plants with dirt.

In the ordinary operation, the cultivator plows operate to cover up the plants with dirt to insure the proper vegetation, but in order to fully cover the plants which have been crushed or cut, I secure a spring plow 34 to one of the beams 15 in any suitable manner to permit the removal thereof if desired.

A steel spring 35 of U-form is secured to the cross braces 16 and 17 and the upper arm which extends rearwardly is held against upward movement by means of a chain 36 connected between said arm and the cross brace 16, at the same time allowing a yielding motion to the attachment independent of the cultivator to compensate for irregularities in the ground surface traveled over. A crank shaft 37 is properly journaled in depending brackets 38 secured to the rear end of the frame 14 and the crank portion thereof is journaled in the rear end of the upper arm of the U-spring 35 so that an operating lever 39 carried by one end of the shaft may be swung forwardly or rearwardly to raise or lower the wheel frame as desired. A segmental rack 40 is also secured to the frame 14 and adapted to be engaged by a dog 41 carried by the operating lever so as to hold the device in any position to regulate the pressure upon the plants as desired.

The device above described will thus be found efficient in cultivating plants and by reason of its extreme simplicity, may be manufactured at a nominal cost and may be attached to cultivators generally in use. The chopper wheel may also be removed if desired and the spring tooth plows used for cleaning the drill.

Having thus described my invention, what I claim is:

1. A device of the class described comprising a frame adapted to be attached to the rear of a cultivator having suitable plows, means attached to the rear of the frame for crushing certain plants and protecting others of a row, said means comprising a wheel journaled on said frame, and having spaced rims, a plurality of pairs of plates provided with slotted openings adapted to register with each other when said plates are disposed in overlapped relation, means disposed through said openings to retain said plates in adjusted lengths around the periphery of the wheel at spaced distances apart, said plates having inturned outer ends engaged in grooves in the rims and means for raising and lowering the frame.

2. A device of the class described comprising a frame adapted to be attached to the rear of a cultivator having suitable plows, means attached to the rear of the frame for crushing certain plants and protecting others of a row, said means comprising a wheel journaled on said frame, and having spaced rims, a plurality of pairs of plates provided with slotted openings adapted to register with each other when said plates are disposed in overlapped relation, means disposed through said openings to retain said plates in adjusted lengths around the periphery of the wheel at spaced distances apart, and knife blades disposed transversely of the wheel intermediate the ends of the plates, said plates being adapted to crush certain plants and allow others to stand therebetween while said knife blades are adapted to assist in destroying said crushed plants.

In testimony whereof I affix my signature, in the presence of two witnesses.

ELVY T. UNDERWOOD.

Witnesses:
 H. J. JOHNSON,
 J. E. KUYKENDALL.

---

Copies of this patent may be obtained for five cents each, by addressing the "Commissioner of Patents Washington, D. C."